United States Patent [19]

Havel

[11] Patent Number: 4,754,202

[45] Date of Patent: Jun. 28, 1988

[54] MULTICOLOR COMPARISON DISPLAY

[76] Inventor: Karel Havel, P.O. Box 66, Station M, Toronto, Ontario, Canada, M6S 4T2

[21] Appl. No.: 881,442

[22] Filed: Jul. 2, 1986

Related U.S. Application Data

[63] Continuation-in-part of Ser. No. 856,196, Apr. 28, 1986.

[51] Int. Cl.⁴ .................................................. G01T 1/24

[52] U.S. Cl. .............................. 315/169.1; 315/169.2; 315/169.3; 313/500; 340/701; 340/815.1; 340/782

[58] Field of Search ............ 340/701, 703, 782, 815.1, 340/815.21; 315/169.1, 169.2, 169.3; 313/500, 501, 507; 250/205, 213 R

[56] References Cited

U.S. PATENT DOCUMENTS

| | | | |
|---|---|---|---|
| 3,911,423 | 10/1975 | Arndt et al. | 250/213 R X |
| 3,924,227 | 12/1975 | Stolov | 340/703 |
| 4,086,514 | 4/1978 | Havel | 313/500 |
| 4,284,884 | 8/1981 | Dyment et al. | 250/205 |
| 4,445,132 | 4/1984 | Ichikawa et al. | 313/500 X |

*Primary Examiner*—David K. Moore
*Assistant Examiner*—Mark R. Powell

[57] ABSTRACT

A multicolor display is disclosed including a plurality of multicolor display areas arranged in rows and columns for simultaneously displaying two display patterns in a comparative fashion. The two patterns are displayed such that portions that appear only in the first pattern are displayed in a first color, portions that appear only in the second pattern are displayed in a second color, and portions that appear in both patterns are displayed in a third color.

6 Claims, 2 Drawing Sheets

PRIOR ART

MULTICOLOR COMPARISON DISPLAY

CROSS REFERENCE TO RELATED APPLICATIONS

This is a continuation-in-part of my copending application Ser. No. 856,196, filed 4/28/86, entitled Multicolor Optical Device.

BACKGROUND OF THE INVENTION

1. Field of the Invention

This invention generally relates to multicolor displays and more specifically to a method and apparatus for comparatively displaying two display patterns on a single multicolor display.

2. Description of the Prior Art

A display device that can change color and selectively display characters is described in my U.S. Pat. No. 4,086,514 entitled Variable Color Display Device and issued on Apr. 25, 1978. This display device includes display areas arranged in a suitable display font, such as well known 7-segment font, which may be selectively energized in groups to display all known characters. Each display area includes three light emitting diodes for emitting light signals of respectively different primary colors which are blended within the display area to form a composite light signal. The color of the composite light signal can be controlled by varying the portions of the primary light signals.

A multicolor display for comparatively exhibiting two display patterns is unknown.

SUMMARY OF THE INVENTION

Accordingly, it is the principal object of this invention to provide an improved multicolor display capable of simultaneously displaying two display patterns in a comparative fashion.

It is another object of the invention to provide a multicolor comparison display that is capable of visually indicating a degree of similarity between two display patterns.

It is further object of the invention to provide a multicolor comparison display with memory.

In summary, the multicolor comparison display includes a plurality of multicolor display areas arranged in rows and columns. Two display patterns may be simultaneously exhibited thereon such that portions that appear only in the first pattern are illuminated in a first color, portions that appear only in the second pattern are illuminated in a second color, and portions that overlap each other are illuminated in a composite color.

Further objects of the invention will become obvious from the accompanying drawings and their description.

BRIEF DESCRIPTION OF THE DRAWINGS

In the drawings in which are shown several possible embodiments of the invention.

Throughout the drawings, like characters indicate like parts.

DESCRIPTION OF THE PREFERRED EMBODIMENTS

Figure 1A:
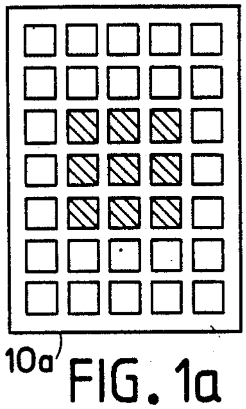
FIG. 1a PRIOR ART
FIG. 1*a* is a plan view of a prior art monochromatic display on which an exemplary pattern in the form of a square is displayed.

Referring now, more particularly, to the drawings, in FIG. 1*a* is shown an exemplary display pattern in the shape of a square displayed on a commercially well known 5×7 dot matrix monochromatic display 10*a*. Another display pattern in the shape of a cross is displayed on a like monochromatic display **10*b*** shown in FIG. 1*b*.

Figure 2:
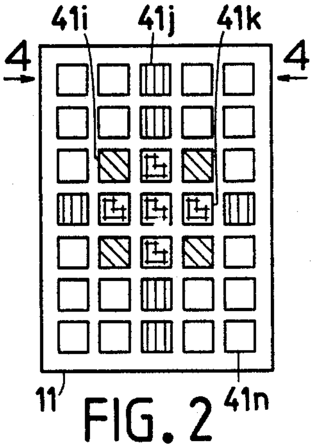
FIG. 2 is a plan view of a multicolor display of the present invention on which both previous patterns are simultaneously displayed in respectively different colors.

As illustrated in FIG. 2, the invention resides in simultaneously displaying both previous display patterns on a single multicolor display 11 being similarly arranged in a 5×7 dot matrix. To facilitate the comparison, the two patterns are displayed according to the following system. The display areas that are illuminated only on the display **10*a***, such as area 41*a*, are illuminated on the display 11 in green color. The display areas that are illuminated only on the display **10*b*, such as area 41*j*, are illuminated on the display 11 in red color. The display areas that are illuminated on both displays 10*a*, 10*b* and that would therefore overlap, such as area 41*k*, are illuminated on the display 11 in yellow color. The display areas that are extinguished on both displays 10*a* and 10*b*, such as area 41*n*, are also extinguished on the display 11**. It would be obvious to those skilled in the art that other color combinations may be devised.

Figure 3A:
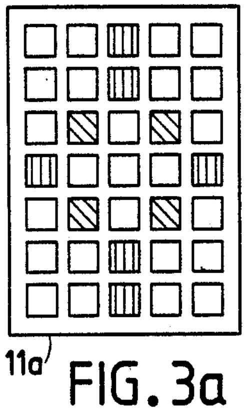
FIG. 3*a* is a similar view of a multicolor display in which are removed overlapping portions of the first and second patterns.
Figure 3B:
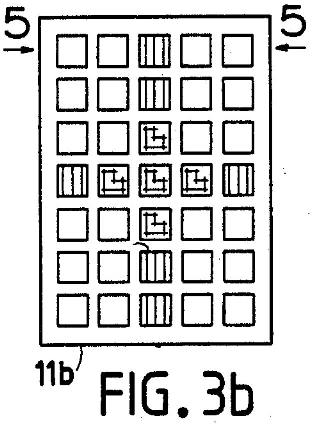
FIG. 3*b* is a similar view of a multicolor display in which are removed portions that appear only in the first pattern.
Figure 3C:
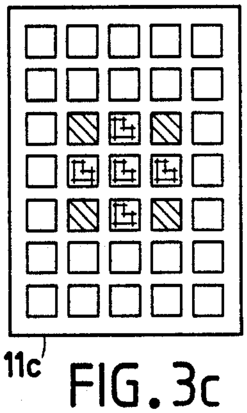
FIG. 3*c* is a similar view of a multicolor display in which are removed portions that appear only in the second pattern.

In FIG. 3*a* is presented another embodiment of a multicolor display **11*a*** on which all overlapping portions of the first and second display patterns are extinguished to thereby display only the different portions of the two patterns. In FIG. 3*b* is presented another multicolor display **11*b*** on which all portions that appear only in the first pattern are extinguished to thereby display only the same portions of the two patterns plus those portions that appear only in the second pattern. FIG. 3*c* is presented another multicolor display **11*c*on which all portions that appear only in the second pattern are extinguished to thereby display only the same portions of the two patterns plus those portions that appear only in the first pattern. The removal of certain colors may be achieved by placing color absorbing filters on the top of the display 11**, as will be more specifically revealed subsequently.

Figure 4:
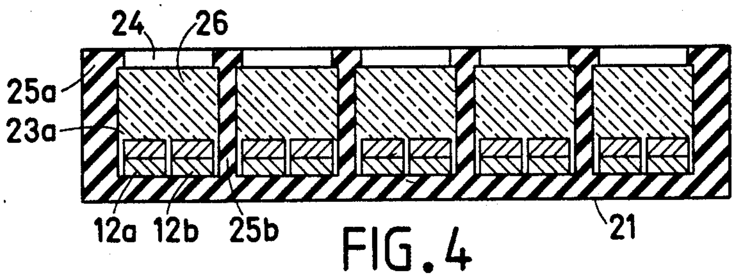
FIG. 4 is a cross-sectional view revealing internal structure of one row of a multicolor display of the invention, taken along the line 4—4 in FIG. 3*b*.

Each display area in the multicolor display of the present invention includes a pair of light emitting diodes (LEDs). An important consideration has been given to physical arrangement of the LEDS in the display areas, as illustrated in FIG. 4. The pairs of LEDs 12*a*, 12*b*, adapted for emitting light of red and green colors, respectively, are disposed in respective chambers 23 which are optically separated from one another by opaque walls 25. Although the chambers are shown to be of certain shapes and dimensions, it is envisioned that they may be modified and rearranged. In the exemplary chamber 23*a*, defined by walls 25*a* and 25*b*, LEDs 12*a* and 12*b* are mounted on a suitable support 21 and completely surrounded by light scattering material 26. When only one LED in the pair is energized, by means of a circuit shown in FIG. 8, it emits light of either primary color through aperture 24. When both LEDs in the pair are energized, light signals of red and green primary colors are blended, by passing through light scattering material 26, to form a composite light signal of substantially yellow color that emerges from the aperture 24.

Figure 5:
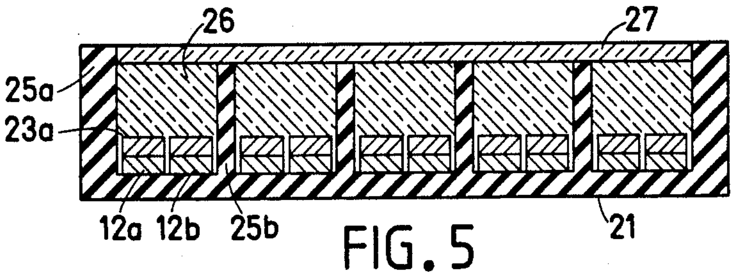
FIG. 5 is a like cross-sectional view of a multicolor display with a color absorbing filter.

A similar embodiment of a multicolor display of the present invention, illustrated in a cross-sectional view in FIG. 5, is characterized by a color filter 27, adapted to absorb light of a predetermined color but transparent to light of other colors, which is disposed on the top of the display to overlay all display areas. The color filter 27 may include commercially well known color absorbing filters which usually contain dye that absorbs a predetermined color, liquid crystal devices capable of absorbing specific colors, and the like. It would be obvious to those skilled in the art that such color filter will also modify the colors of transmitted light (not shown).

To absorb light of yellow color, the color filter may have characteristics of a commercially well known blue color filter. To absorb light of green color, the color filter may have characteristics of a purple color filter. To absorb light of red color, the color filter may have characteristics of a blue-green color filter.

Figure 6:
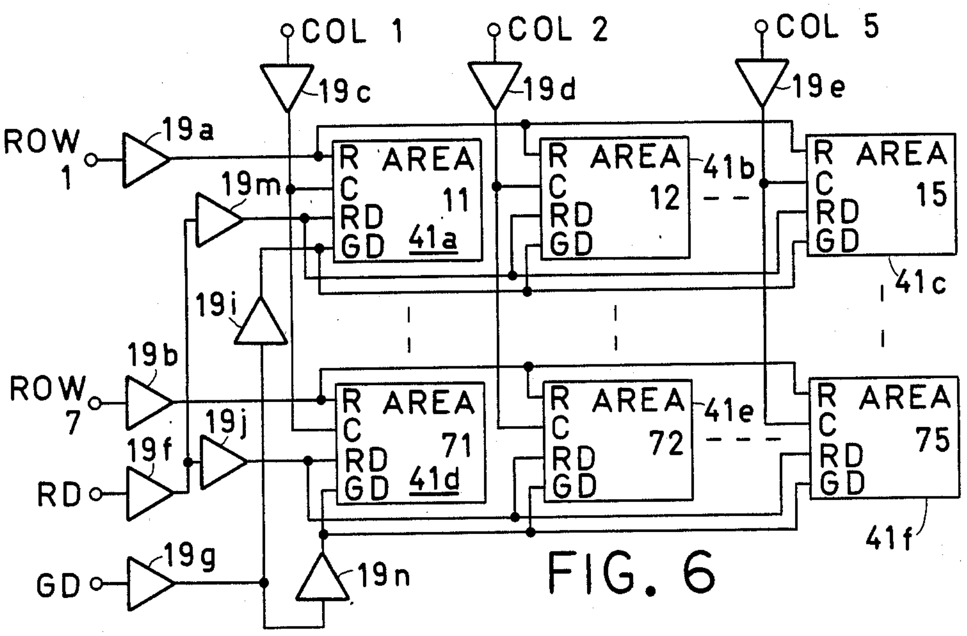
FIG. 6 is a block diagram of a matrix of multicolor display areas arranged in rows and columns.

The matrix of multicolor display areas arranged in rows and columns illustrated in FIG. 6 corresponds to the multicolor display 11 viewed in FIG. 2. A particular display area may be conveniently identified by its row and column numbers. By way of an example, the display area 12, shown at 41*b*, is located at row 1 and column 2. The display area 75, shown at 41*f*, is located at row 7 and column 5. To facilitate the addressing, each display area has a Row input R. Column input C, Red Data input RD, and Green Data input GD, all adapted for accepting electrical signals. It is clearly evident from FIG. 6 that the Row inputs R of all display areas are located in the same row are coupled. Similarly, the Column inputs C of all display areas located in the same column are coupled. The Red Data inputs RD of all display areas in the matrix are coupled. In a similar fashion, the Green Data inputs GD of all display areas are coupled.

All display areas may be extinguished by application of a suitable reset pulse, as will be revealed subsequently. To illuminate a desired portion in a desired display area, it is necessary to simultaneously activate the row input in which the area is located, column input in which the area is located, and either of, or both, inputs RD, GD.

Figure 7:
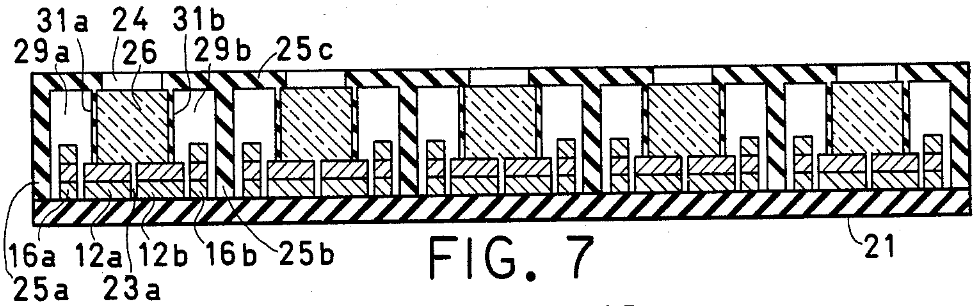
FIG. 7 is a cross-sectional view revealing internal structure of one row of a multicolor display with memory.

The multicolor display illustrated in FIG. 7 includes five display elements disposed in chambers separated by respective walls 25. The exemplary display element located in chamber 23*a*, defined by walls 25*a* and 25*b*, includes two pairs of associated closely adjacent light emitting diodes and phototransistors 12*a* and 16*a*, 12*b* and 16*b* electrically coupled as in FIG. 9. The light emitting diodes are adapted for emitting upon activation light signals of respectively different primary colors. In the small chamber 29*a*, phototransistor 16*a* is completely surrounded by the chamber walls, but its associated light emitting diode 12*a* is only partially disposed therein, being partially overlayed by opaque chamber wall 31*a* such that its one portion is located within small chamber 29*a*, and its remaining portion is located within the chamber 23*a*. The vertically extending portion of the chamber wall 31*a* abuts the light emitting diode 12*a* and provides a hermetic seal therebetween so as to secure small chamber 29*a* from the presence of ambient light. The active area of the phototransistor 16*a* is oriented to intercept light signals emitted from the portion of the light emitting diode 12*a* within the chamber 29*a* to exert a toggle effect by varying resistance of the phototransistor in a sense tending to maintain the light emitting diode either in its illuminated condition or in its extinguished condition. The other phototransistor 16*b* is similarly completely disposed in small chamber 29*b*, and its associated light emitting diode 12*b* is partially disposed therein and partially disposed in the chamber 23*a*. The light signals emitted from the portions of the light emitting diodes that are located in the chamber 23*a* are blended by passing through transparent light scattering material 26 to form a composite light signal. An aperture 24 is formed in the chamber top wall 25*c* such that the composite light signal may be viewed externally.

Figure 8:
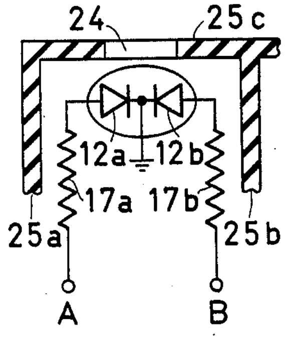
FIG. 8 is a schematic diagram showing the detail of one display element of FIG. 4.

Proceeding now to the detailed description, in FIG. 8 is shown a schematic diagram of one display element of FIG. 4 which includes a red LED 12*a*, green LED 12*b*, and resistors 17*a* and 17*b* accomodated in a chamber defined by side walls 25*a*, 25*b* and top wall 25*c*. When a positive voltage of suitable value is applied to the input A, current flows via current limiting resistor 17*a*, which confines the current flow, and LED 12*a* to ground. As a consequence, the red LED 12*a* illuminates and maintains its illuminated condition as long as the voltage is present at the input A. In a similar fashion, a suitable positive voltage applied to the input B causes the green LED 12*b* to illuminate. As was indicated earlier, light signals emitted by the LEDs 12*a*, 12*b* are blended to form a composite light signal of substantially yellow color.

Figure 9:
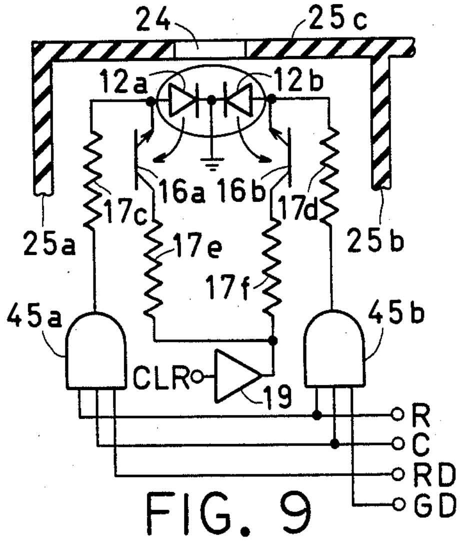
FIG. 9 is a schematic diagram showing the detail of one display element of FIG. 7.

The display element shown in FIG. 9 is capable of retaining the conditions of its LEDs after termination of the input signal. The device employs commercially well known phototransistors which exhibit very high resistance, typically hundreds of Megaohms, when maintained in dark and very low resistance, typically tens of Ohms, when illuminated. Each display element includes two pairs of electrooptical components, red LED 12*a* and its associated phototransistor 16*a*, and green LED 12*b* and its associated phototransistor 16*b*. An optical feedback is established in each pair from the light emitting diode to the phototransistor to exert a toggle effect by varying resistance of the phototransistor in a sense tending to maintain the light emitting diode either in its illuminated condition or in its extinguished condition. The display element of FIG. 9 is similar to that shown in FIG. 8 and additionally includes AND gates 45a and 45b for gating signals R, C, RD, and GD. Two logic levels, referred to as a high and low, are used througout the description of the circuit. To reset the entire display, a low logic level is momentarily applied to its Clear input CLR. As a consequence, the output of a preferably TTL (Transistor Transistor Logic) buffer 19 also drops to a low logic level. Since a TTL device is not capable of sourcing current from a low logic level output, no current can flow therefrom to ground. The LEDs 12a and 12b in all display elements therefore extinguish, and the resistances of phototransistors 16a and 16b in all elements rise to very high values. When a high logic level returns to the input CLR, the output of buffer 19 also rises to a high logic level. However, the currents flowing via resistor 17e, high resistance of phototransistor 16a and LED 12a to ground, and in parallel, via resistor 17f, high resistance of phototransistor 16b and LED 12b to ground, are very small and not sufficient to illuminate the LEDs. This state is therefore stable and will exist until the inputs R, C, RD, GD are properly activated.

Figure 10A:
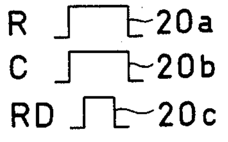
FIG. 10*a* is a timing diagram showing the relationship of signals for illuminating red LED in the selected display element.

The operation of the display element in FIG. 9 will be explained on examples of illuminating its either portion. Assuming that the display element is located at the intersection of the row 1 and column 2 in FIG. 6 and by referring additionally to FIG. 10a, to illuminate the red LED, a positive going pulse 20a is applied to the input ROW 1, to activate via buffer 19a all Row inputs in the row 1, positive going pulse 20b is applied to the input COL 2, to activate via buffer 19d all column inputs in the column 2, and positive going pulse 20c is applied to the input RD, to activate via buffers 19f, 19m, etc., RD inputs of all display elements. The width of the pulse 20c depends on the response time of the phototransistor and should be sufficient to allow its resistance to drop below a predetermined triggering point. As a consequence, the output of AND gate 45a only in the display element 12 rises momentarily to a high logic level, and current flows therefrom via resistor 17c and LED 12a to ground. The red LED 12a illuminates, and its emission causes the resistance of its associated phototransistor 16a to rapidly drop to a very low value. As a result of a positive optical feedback, whereby the increase in luminance of the LED causes the decrease in resistance of the phototransistor which in turn has an effect of further increase in the luminance and further decrease in the resistance, the current in the red LED branch, from buffer 19, via resistor 17e and phototransistor 16a, sharply rises to a value sufficient to maintain the LED fully illuminated. At the conclusion of the pulse 20c, the magnitude of the LED current is limited substantially by the value of the current limiting resistor 17e. It is readily apparent that this state is stable and will exist until another input of the display element is activated.

Figure 10B:
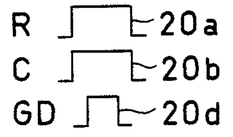
FIG. 10*b* is a timing diagram showing the relationship of signals for illuminating green LED in the selected display element.

Similarly, to illuminate the green LED in the display element 12, with reference to FIG. 10b, pulse 20a is applied to the input ROW 1, pulse 20b is applied to the input COL 2, and pulse 20d is applied to the input GD. As a consequence, the output of AND gate 45b in the element 12 rises momentarily to a high logic level, and current flows therefrom via resistor 17d and LED 12b to ground, thereby causing the LED to illuminate. The green LED 12b will be maintained in its illuminated condition, by virtue of an optical feedback to its associated phototransistor 16b, until it is reset.

When both red LED 12a and green LED 12b in the same display area are illuminated, the light signals of red and green colors are blended within the display area to form a composite light signal of substantially yellow color, as indicated previously.

When the output of buffer 19 is at a high logic level, the specific voltage therein may be within a wide voltage range. However, the voltage is the same for all LED branches connected thereto. Thus the accuracy of the ratio of currents in the LED branch pairs in each display element and resulting accuracy of the hue of composite light depend only on the matching of the current limiting resistors in each pair.

Figure 1B:
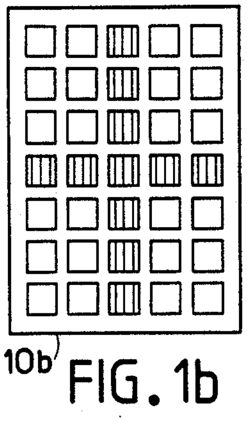
FIG. 1*b* is a plan view of a prior art monochromatic display on which an exemplary pattern in the form of a cross is displayed.

Two display patterns, each including a plurality of pattern elements corresponding to display areas of the multicolor display 11, may be simultaneously displayed thereon. The display pattern in the form of a square shown in FIG. 1a may be illuminated on the multicolor display 11 in green color by activating GD inputs of all display areas located within the columns 2 to 4 and rows 3 to 5. The display pattern in the form of a cross shown in FIG. 1b may be illuminated on the same display in red color by activating RD inputs of all display areas in column 3 and all display areas in the row 4. It is readily apparent that all overlapping display areas will be illuminated in yellow color due to blending of red and green colors therein. The two illuminated patterns may be now readily compared, as viewed in FIG. 2. The portions that appear only in the display pattern shown in FIG. 1a are illuminated in FIG. 2 in green color, the portions that appear only in the display pattern shown in FIG. 1b are illuminated in FIG. 22 in red color, and all overlapping portions are illuminated in FIG. 2 in yellow color. By comparing the size of the yellow area with combined sizes of the red and green areas in FIG. 2, the degree of similarity between the two display patterns may be readily determined. The display patterns that are very similar are illuminated mostly in yellow color. The display patterns that are not similar are illuminated mostly in red and green colors.

It would be obvious to those skilled in the art that other types of light sensors, such are photodiodes, photodarlingtons, phototriacs, photo sensitive silicon controlled rectifiers, photodetectors, photoresistors, photoconductive cells, and the like, may be alternatively used in the preceding circuits.

The invention may be now briefly summarized. The method was disclosed of comparatively displaying a first and second display patterns on a single multicolor display by causing the patterns to be displayed in respectively different primary colors and by causing the overlapping portions of the two patterns to be displayed in a composite color.

A multicolor display capable of simultaneously displaying two display patterns and of indicating the degree of similarity therebetween was disclosed that comprises a plurality of multicolor display areas arranged according to a predetermined system. Each display area includes a first and second light sources for emitting upon activation light signals of respectively different primary colors which are combined in each display area to obtain a composite light signal of a composite color. First and second input means adapted for receiving input signals are provided for selectively illuminating the first and second light sources in the display areas whereby each display area may be selectively illuminated in a first primary color when only its first input is activated, in a second primary color when only its second input is activated, and in a composite color when both its inputs are activated.

All matter herein described and illustrated in the accompanying drawings should be interpreted as illustrative and not in a limiting sense. It would be obvious that numerous modifications can be made in the construction of the preferred embodiments shown herein, without departing from the spirit of the invention as defined in the appended claims.

CORRELATION TABLE

This is a correlation table of reference characters used in the drawings herein, their descriptions, and examples of commercially available parts.

| # | DESCRIPTION | EXAMPLE |
|---|---|---|
| 10 | monochromatic display | |
| 11 | multicolor display | |
| 12a | red LED | |
| 12b | green LED | |
| 16 | phototransistor | |
| 17 | resistor | |
| 19 | buffer | 74LS244 |
| 20 | pulse | |
| 21 | support | |
| 23 | chamber for light emitting diodes | |
| 24 | aperture | |
| 25 | opaque wall | |
| 26 | light scattering material | |
| 27 | color absorbing filter | |
| 29 | small chamber | |
| 31 | opaque chamber wall | |
| 41 | one display area in the matrix | |
| 45 | 3-input AND gate | 74LS11 |

What I claim is:

1. A method of comparatively displaying a first display pattern and a second display pattern, on a single multicolor display means, by causing the portions that appear only in said first display pattern to be displayed on said multicolor display means in a first color, by causing the portions that appear only in said second display pattern to be displayed on said multicolor display means in a second color, and by causing the portions that appear in both said first display pattern and said second display pattern to be displayed on said multicolor display means in a third color, whereby the degree of similarity between said first display pattern and said second display pattern may be determined by visually comparing the sizes of areas illuminated in said first color, said second color, and said third color.

2. A method as defined in claim 1 wherein said third color is obtained by the blending of said first color and said second color.

3. A method of comparatively displaying a first display pattern and a second display pattern, on a single multicolor display means including a plurality of multicolor display areas arranged according to a predetermined system and optically separated from one another, by causing the portions that appear only in said first display pattern to be displayed on the corresponding display areas in a first color, by causing the portions that appear only in said second display pattern to be displayed on the corresponding display areas in a second color, and by causing the portions that appear in both said first display pattern and said second display pattern to be displayed on the corresponding display area in a composite color obtained by the blending of said first color and said second color, whereby the degree of similarity between said first display pattern and said second display pattern may be determined by visually comparing the combined sizes of display areas illuminated in said first color and said second color with the size of display areas illuminated in said composite color.

4. A method of comparatively displaying a first display pattern and a second display pattern, on a single multicolor display means including a plurality of multicolor display areas arranged according to a predetermined system and optically separated from one another, by causing the display areas corresponding to said first display pattern to be illuminated in a first color, by causing the display areas corresponding to said second display pattern to be illuminated in a second color, and by causing said first color and said second color to be blended in each display area illuminated in both said first color and said second color to obtain a composite color, whereby the degree of similarity between said first display pattern and said second display pattern may be determined by visually comparing the combined sizes of display areas illuminated in said first color and said second color with the size of display areas illuminated in said composite color.

5. A multicolor comparison display for comparatively displaying a first display pattern and a second display pattern comprising:

a plurality of display areas arranged according to a predetermined system and optically separated from one another, each said display area including a first light source for emitting upon activation light signals of a first color, a second light source for emitting upon activation light signals of a second color, and means for blending said light signals in each said display area to obtain a composite light signal of a composite color;

means for selectively activating said first light sources to illuminate in said first color certain of said display areas corresponding to said first display pattern;

means for selectively activating said second light sources to illuminate in said second color certain of said display areas corresponding to said second display pattern;

whereby all display areas corresponding to the portions that appear in both said first display pattern and said second display pattern illuminate in said composite color; and the degree of similarity between said first display pattern and said second display pattern may be determined by visually comparing the combined sizes of display areas illuminated in said first color and said second color with the size of display areas illuminated in said composite color.

6. A multicolor comparison display for comparatively displaying a first display pattern and a second display pattern comprising:

a plurality of chambers arranged in a side by side relation and optically separated from one another by opaque walls, each said chamber having disposed therein a first light source for emitting upon activation light signals of a first color, a second light source for emitting upon activation light signals of a second color, and means for blending said light signals within said chamber to obtain a composite light signal of a composite color, each said chamber having an aperture for passing light signals emitted therefrom, the apertures in said chambers being arranged to form a plurality of display areas;

means for selectively activating said first light sources to illuminate in said first color certain of said display areas corresponding to said first display pattern;

means for selectively activating said second light sources to illuminate in said second color certain of said display areas corresponding to said second display pattern;

whereby all display areas corresponding to the portions that appear in both said first display pattern and said second display pattern illuminate in said composite color; and the degree of similarity between said first display pattern and said second display pattern may be determined by visually comparing sizes and display areas illuminated in said first color and said second color with the size of display areas illuminated in said composite color.

* * * * *